US012779624B2

(12) United States Patent
Mori et al.

(10) Patent No.: US 12,779,624 B2
(45) Date of Patent: Nov. 3, 2026

(54) HOLDING SURFACE MAINTAINING METHOD

(71) Applicant: DISCO COROPORATION, Tokyo (JP)

(72) Inventors: Takenobu Mori, Tokyo (JP); Mai Haneda, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 468 days.

(21) Appl. No.: 18/503,529

(22) Filed: Nov. 7, 2023

(65) Prior Publication Data

US 2024/0157510 A1 May 16, 2024

(30) Foreign Application Priority Data

Nov. 10, 2022 (JP) ................................ 2022-180219

(51) Int. Cl.

*B24B 49/04* (2006.01)
*B24B 1/00* (2006.01)
*B24B 7/04* (2006.01)
*B24B 41/06* (2012.01)
*G01B 5/06* (2006.01)

(52) U.S. Cl.

CPC .............. *B24B 49/045* (2013.01); *B24B 1/00* (2013.01); *B24B 7/04* (2013.01); *B24B 41/068* (2013.01); *G01B 5/061* (2013.01)

(58) Field of Classification Search

CPC ......... B24B 7/04; B24B 7/228; B24B 41/068; B24B 1/00; B24B 41/06; B24B 41/061

See application file for complete search history.

(56) References Cited

FOREIGN PATENT DOCUMENTS

| | | | | | |
|---|---|---|---|---|---|
| JP | 2008073785 | A | | 4/2008 | |
| JP | 4916833 | B2 | * | 4/2012 | |
| JP | 6109010 | B2 | * | 4/2017 | |
| JP | 6489961 | B2 | * | 3/2019 | |
| JP | 2020049557 | A | * | 4/2020 | |
| JP | 2020179478 | A | * | 11/2020 | |
| JP | 2021053716 | A | * | 4/2021 | |
| JP | 2022020281 | A | * | 2/2022 | ............ B24B 41/00 |
| JP | 2022041489 | A | * | 3/2022 | |
| JP | 2022067769 | A | | 5/2022 | |

OTHER PUBLICATIONS

English Translation of JP-6109010-B2 (Year: 2017).*
English Translation of JP-2022041489-A (Year: 2020).*

(Continued)

*Primary Examiner* — Courtney D Heinle
*Assistant Examiner* — Wesley Le Fisher
(74) *Attorney, Agent, or Firm* — GREER BURNS & CRAIN, LTD.

(57) ABSTRACT

Whether or not there is an abnormality in a holding surface is determined on the basis of a difference between initial holding surface height data as the height of the holding surface immediately after a holding surface grinding step and interim holding surface height data as the height of the holding surface after a grinding step and a holding surface cleaning step are performed a plurality of times. Hence, a wafer does not need to be ground in order to determine whether or not there is an abnormality in the holding surface. An amount of consumption of wafers can therefore be suppressed.

2 Claims, 8 Drawing Sheets

(56) References Cited

OTHER PUBLICATIONS

English Translation of JP-2020049557-A (Year: 2020).*
English Translation of JP-2020179478-A (Year: 2020).*
English Translation of JP-2022020281-A (Year: 2022).*
English Translation of JP-2021053716-A (Year: 2021).*
English Translation of JP-4916833-B2 (Year: 2012).*
English Translation of JP-6489961-B2 (Year: 2019).*
Office Action issued in counterpart Japanese patent application 2022-180219, dated May 26, 2026.

* cited by examiner

HOLDING SURFACE MAINTAINING METHOD

BACKGROUND OF THE INVENTION

Field of the Invention

The present invention relates to a holding surface maintaining method.

Description of the Related Art

As disclosed in Japanese Patent Laid-Open No. 2008-73785, a grinding apparatus grinds a wafer held on a holding surface of a porous member to a uniform thickness by grinding stones. Self-grinding that grinds the holding surface while rotating holding surface grinding stones fitted to a spindle grinds the holding surface into a conical shape having the center of the holding surface as a vertex thereof, and forms the holding surface such that a radius part thereof is parallel with the lower surface of the holding surface grinding stones.

At a time of grinding the wafer, grinding stones for grinding the wafer are fitted to the spindle. The holding surface grinding stones and the grinding stones for grinding the wafer are formed in an identical shape. Therefore, the lower surface of the grinding stones for grinding the wafer which grinding stones are fitted to the spindle and the radius part of the holding surface are parallel with each other.

SUMMARY OF THE INVENTION

Grinding swarf generated by grinding the wafer by the grinding stones adheres to the holding surface of the porous member. In order to remove the grinding swarf adhering to the holding surface, after the wafer is separated from the holding surface, cleaning grindstones are brought into contact with the holding surface to grind away the grinding swarf. Therefore, each time the cleaning is performed, the holding surface is ground by the cleaning grindstones by a small amount, so that a central part of the holding surface becomes nonparallel with the lower surface of the grinding stones. The wafer ground while held on such a holding surface is less likely to have a uniform in-plane thickness.

Conventionally, in order to recognize whether or not the radius part of the holding surface is parallel with the lower surface of the grinding stones, a wafer held on the holding surface is ground, the thickness of the wafer after being ground is measured at a plurality of positions in a radial direction, and thickness variation is checked. That is, wafers are consumed in order to determine the quality of the holding surface.

It is accordingly an object of the present invention to provide a holding surface maintaining method that can determine the quality of the holding surface of the grinding apparatus without grinding a wafer.

In accordance with an aspect of the present invention, there is provided a holding surface maintaining method for maintaining, in a normal state, a holding surface of a grinding apparatus that grinds, by grinding stones, a wafer held on a holding surface of a chuck table, the holding surface maintaining method including a holding surface grinding step of grinding the holding surface by holding surface grinding stones, an initial holding surface height measuring step of measuring a height of the holding surface ground in the holding surface grinding step, at a plurality of measurement points having different distances from a center of the holding surface, a storage step of storing initial holding surface height data as data on the height of the holding surface, the height being measured in the initial holding surface height measuring step, an interim holding surface height measuring step of measuring the height of the holding surface at the same measurement points as in the initial holding surface height measuring step after performing, a plurality of times after the storage step, the grinding of the wafer held on the holding surface and cleaning of the holding surface from which the wafer is separated, a determining step of obtaining, at each of the measurement points, a difference between the initial holding surface height data stored in the storage step and interim holding surface height data as data on the height of the holding surface, the height being measured in the interim holding surface height measuring step, and determining, when the difference is equal to or less than an allowable value set in advance, that the holding surface is normal or determining, when the difference exceeds the allowable value, that the holding surface is abnormal, and a holding surface restoring step of grinding the holding surface by the holding surface grinding stones when it is determined in the determining step that the holding surface is abnormal.

Preferably, the grinding apparatus includes a rotating mechanism that rotates the chuck table about the center of the holding surface, and in the initial holding surface height measuring step and the interim holding surface height measuring step, the chuck table is rotated, and the height of the holding surface is measured spirally.

The present maintaining method determines whether or not there is an abnormality in the holding surface, on the basis of the difference between the initial holding surface height data as the height of the holding surface immediately after the holding surface grinding step (self-grinding) and the interim holding surface height data as the height of the holding surface after a grinding step and the holding surface cleaning step are performed a plurality of times. Hence, the wafer does not need to be ground in order to determine whether or not there is an abnormality in the holding surface. It is therefore possible to suppress an amount of consumption of wafers.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

Figure 1:
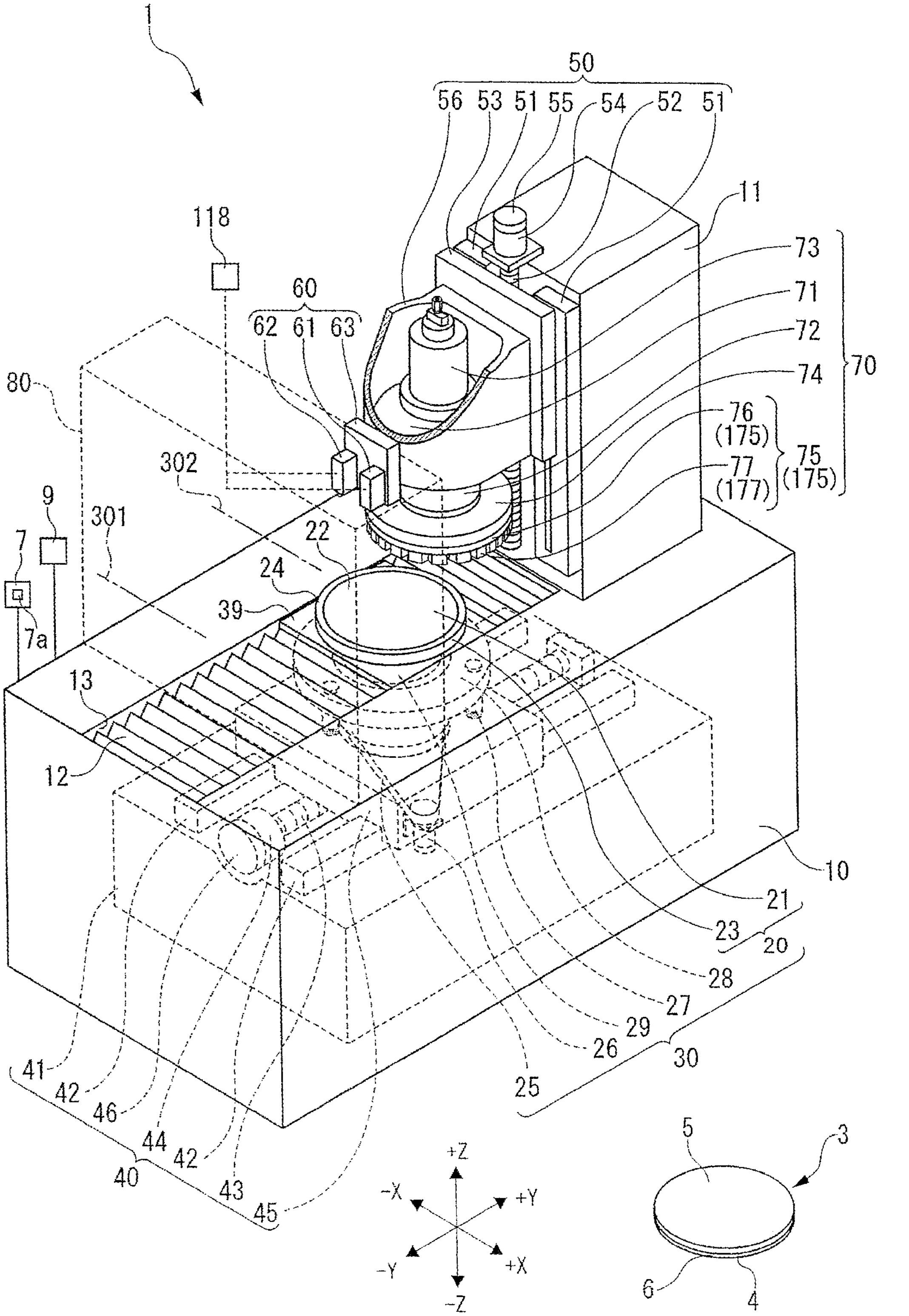
FIG. 1 is a perspective view illustrating a configuration of a grinding apparatus.

As illustrated in FIG. 1, a grinding apparatus 1 as a processing apparatus according to the present embodiment is an apparatus for grinding, by grinding stones 77, a wafer 3 held on a holding surface 22 of a chuck table 20.

The wafer 3 is, for example, a semiconductor wafer in a circular shape. The wafer 3 has a top surface 4 and an undersurface 5. In FIG. 1, the top surface 4 of the wafer 3 which top surface is oriented downward holds a plurality of devices. The devices are protected by a protective tape 6 being affixing to the top surface 4. The undersurface 5 of the wafer 3 is a processing target surface to be subjected to grinding processing.

The grinding apparatus 1 includes a base 10 in a rectangular parallelepipedic shape, a column 11 extending upward, and a controller 7 that controls various members of the grinding apparatus 1. An opening portion 13 is provided on an upper surface side of the base 10. Moreover, a wafer holding mechanism 30 is disposed within the opening portion 13.

The wafer holding mechanism 30 includes the chuck table 20 having the holding surface 22 for holding the wafer 3, a chuck table base 29 that supports the chuck table 20, a rotating mechanism 26 that is connected to a base end side of the chuck table base 29 via an endless belt 25, a support member 28 that supports the chuck table base 29, and a plurality of support columns 27 that support the support member 28.

Figure 2:
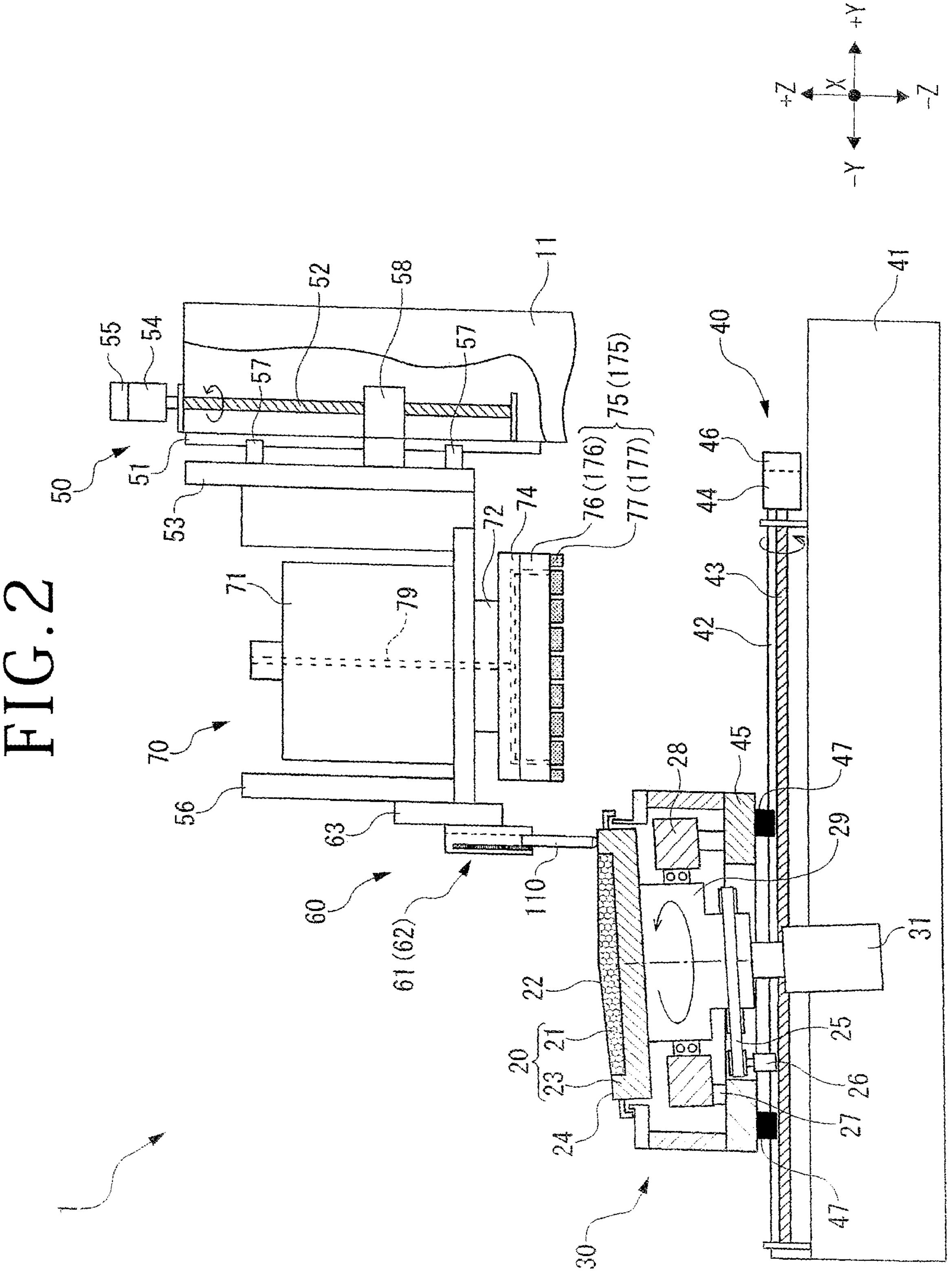
FIG. 2 is a partial side sectional view illustrating the configuration of the grinding apparatus.

As illustrated in FIG. 1 and FIG. 2, the chuck table 20 includes a porous member 21 and a frame body 23 that houses the porous member 21 such that the upper surface of the porous member 21 is exposed. The upper surface of the porous member 21 is the holding surface 22 that holds the wafer 3 under suction. As illustrated in FIG. 2, the holding surface 22 is formed in a shape of a circular conical surface having the center of the holding surface 22 as a vertex thereof. The chuck table 20 is tilted by the support columns 27 such that a radius part of the holding surface 22 is parallel with the lower surface of the grinding stones 77. The holding surface 22 is made to communicate with a suction source (not illustrated). The holding surface 22 thereby holds the wafer 3 under suction. A frame body surface 24 as the upper surface of the frame body 23 surrounds the holding surface 22, and is formed in such a manner as to be in a same plane as (flush with) the holding surface 22.

The rotating mechanism 26 includes a motor and a driving pulley. The rotating mechanism 26 rotates the chuck table base 29 by revolving the endless belt 25. The chuck table 20 supported by the chuck table base 29 thereby rotates about a table rotational axis passing through the center of the holding surface 22. That is, the rotating mechanism 26 is configured to rotate the chuck table 20 about the center of the holding surface 22. In addition, as illustrated in FIG. 2, a rotary joint 31 in which a suction passage for the holding surface 22 or the like is disposed is connected to a lower part of the chuck table base 29.

As illustrated in FIG. 1, the periphery of the chuck table 20 is provided with a cover plate 39 that is moved along a Y-axis direction together with the chuck table 20. In addition, a bellows cover 12 that expands or contracts in the Y-axis direction is coupled to the cover plate 39. Moreover, a Y-axis direction moving mechanism 40 is disposed below the wafer holding mechanism 30.

The Y-axis direction moving mechanism 40 moves the chuck table 20 and the grinding stones 77 of a grinding mechanism 70 relative to each other in the Y-axis direction as a direction parallel with the holding surface 22. In the present embodiment, the Y-axis direction moving mechanism 40 is configured to move the wafer holding mechanism 30 including the chuck table 20 in the Y-axis direction with respect to the grinding mechanism 70.

The Y-axis direction moving mechanism 40 includes a pair of Y-axis guide rails 42 parallel with the Y-axis direction, a Y-axis moving table 45 that slides on the Y-axis guide rails 42, a Y-axis ball screw 43 parallel with the Y-axis guide rails 42, a Y-axis motor 44 connected to the Y-axis ball screw 43, a Y-axis encoder 46 for sensing an amount of rotation (the number of times of rotation and a rotational angle) of the Y-axis ball screw 43, and a holding base 41 that holds these.

The Y-axis moving table 45 is slidably installed on the Y-axis guide rails 42 with slide members 47 (see FIG. 2) interposed therebetween. A nut portion (not illustrated) is fixed to the lower surface of the Y-axis moving table 45. The Y-axis ball screw 43 is screwed into the nut portion. The Y-axis motor 44 is coupled to one end portion of the Y-axis ball screw 43.

In the Y-axis direction moving mechanism 40, when the Y-axis motor 44 rotates the Y-axis ball screw 43, the Y-axis moving table 45 moves in the Y-axis direction along the Y-axis guide rails 42. The wafer holding mechanism 30 is mounted on the Y-axis moving table 45. Hence, as the Y-axis moving table 45 moves in the Y-axis direction, the wafer holding mechanism 30 including the chuck table 20 moves in the Y-axis direction.

The Y-axis encoder 46 is rotated when the Y-axis motor 44 rotates the Y-axis ball screw 43. The Y-axis encoder 46 can recognize an amount of rotation (the number of times of rotation and a rotational angle) of the Y-axis ball screw 43. Then, in the present embodiment, the controller 7 recognizes the amount of rotation of the Y-axis ball screw 43 which amount is recognized by the Y-axis encoder 46, and can sense the position in the Y-axis direction of the chuck table 20 moved in the Y-axis direction, on the basis of a result of the recognition.

In the present embodiment, as illustrated in FIG. 1, the Y-axis direction moving mechanism 40 moves the chuck table 20 of the wafer holding mechanism 30 along the Y-axis direction between a holding position 301 on a −Y direction side for holding the wafer 3 by the holding surface 22 and a processing position 302 on a +Y direction side for grinding processing of the wafer 3.

In addition, as illustrated in FIG. 1 and FIG. 2, the column 11 is erected in the rear (+Y direction side) on the base 10. The front surface of the column 11 is provided with the grinding mechanism 70 for grinding the wafer 3 and a vertical moving mechanism 50.

The vertical moving mechanism 50 moves the chuck table 20 and the grinding stones 77 of the grinding mechanism 70 relative to each other in a Z-axis direction (grinding feed direction) perpendicular to the holding surface 22. In the present embodiment, the vertical moving mechanism 50 is configured to move the grinding mechanism 70 including the grinding stones 77 in the Z-axis direction with respect to the chuck table 20.

The vertical moving mechanism 50 includes a pair of Z-axis guide rails 51 parallel with the Z-axis direction, a Z-axis moving table 53 that slides on the Z-axis guide rails 51, a Z-axis ball screw 52 parallel with the Z-axis guide rails 51, a Z-axis motor 54 connected to the Z-axis ball screw 52, a Z-axis encoder 55 for sensing an amount of rotation (the number of times of rotation and a rotational angle) of the Z-axis ball screw 52, and a holder 56 attached to the Z-axis moving table 53. The holder 56 supports the grinding mechanism 70.

The Z-axis moving table 53 is slidably installed on the Z-axis guide rails 51 with slide members 57 (see FIG. 2) interposed therebetween. A nut portion 58 is fixed to the Z-axis moving table 53. The Z-axis ball screw 52 is screwed into the nut portion 58. The Z-axis motor 54 is coupled to one end portion of the Z-axis ball screw 52.

In the vertical moving mechanism 50, when the Z-axis motor 54 rotates the Z-axis ball screw 52, the Z-axis moving table 53 moves in the Z-axis direction along the Z-axis guide rails 51. Thus, the holder 56 attached to the Z-axis moving table 53 and the grinding mechanism 70 supported by the holder 56 also move in the Z-axis direction together with the Z-axis moving table 53.

The Z-axis encoder 55 is rotated when the Z-axis motor 54 rotates the Z-axis ball screw 52. The Z-axis encoder 55 can recognize an amount of rotation (the number of times of rotation and a rotational angle) of the Z-axis ball screw 52. Then, in the present embodiment, the controller 7 recognizes the amount of rotation of the Z-axis ball screw 52 which amount is recognized by the Z-axis encoder 55, and can sense the height position of the grinding stones 77 of the grinding mechanism 70 moved in the Z-axis direction, on the basis of a result of the recognition.

The grinding mechanism 70 is an example of a processing mechanism for processing the wafer 3 held under suction on the holding surface 22. The grinding mechanism 70 performs grinding processing of the wafer 3. The grinding mechanism 70 includes a spindle housing 71 fixed to the holder 56, a spindle 72 rotatably held by the spindle housing 71, a spindle motor 73 that rotationally drives the spindle 72, a wheel mount 74 attached to a lower end of the spindle 72, and a grinding wheel 75 supported by the wheel mount 74.

The spindle housing 71 is held by the holder 56 in such a manner as to extend in the Z-axis direction. The spindle 72 is extended in the Z-axis direction in such a manner as to be orthogonal to the holding surface 22 of the chuck table 20, and is rotatably supported by the spindle housing 71.

The spindle motor 73 is coupled to an upper end side of the spindle 72. The spindle motor 73 rotates the spindle 72 about an axis extending in the Z-axis direction.

The wheel mount 74 is formed in a disk shape, and is fixed to a lower end (distal end) of the spindle 72. The wheel mount 74 supports the grinding wheel 75.

The grinding wheel 75 is formed in such a manner as to have substantially a same outside diameter as the outside diameter of the wheel mount 74. The grinding wheel 75 includes an annular wheel base 76 formed of a metallic material. A processing water passage 79 for supplying processing water from an unillustrated water source to the grinding stones 77 is formed within the wheel base 76, the wheel mount 74, and the spindle 72 (see FIG. 2).

A plurality of grinding stones 77 arranged annularly are fixed to the lower surface of the wheel base 76 over an entire circumference. The grinding stones 77 are rotated by the spindle motor 73 together with the spindle 72, and the grinding stones 77 grind the undersurface 5 of the wafer 3 held on the chuck table 20.

In addition, in the present embodiment, the grinding mechanism 70 allows a holding surface grinding wheel 175 including holding surface grinding stones 177 to be provided to the wheel mount 74 in place of the grinding wheel 75. The holding surface grinding wheel 175 has a similar shape to that of the grinding wheel 75. Specifically, the holding surface grinding wheel 175 includes a wheel base 176 having an identical shape to that of the wheel base 76 and the holding surface grinding stones 177 having an identical shape to that of the grinding stones 77, the holding surface grinding stones 177 being fixed to the lower surface of the wheel base 176.

In addition, as illustrated in FIG. 1, the grinding apparatus 1 includes a touch panel 9. The touch panel 9 displays various kinds of information related to the grinding apparatus 1. The touch panel 9 is also used to set various kinds of information. Thus, the touch panel 9 functions as an input member for inputting information, and functions also as a display member for displaying information.

In addition, the grinding apparatus 1 includes a first thickness measuring instrument 60 including a first height measuring instrument 61 and a second height measuring instrument 62. The first height measuring instrument 61 is used to measure the height of the wafer 3 by coming into contact with the undersurface 5 as the upper surface of the wafer 3 held on the holding surface 22.

The second height measuring instrument 62 can be disposed above the frame body surface 24 of the chuck table 20 that holds the wafer 3. The second height measuring instrument 62 is used to measure the height of the frame body surface 24 (that is, the height of the holding surface 22). Moreover, the first thickness measuring instrument 60 can calculate the thickness of the wafer 3 on the basis of a difference between the measured height of the wafer 3 and the measured height of the holding surface 22.

Incidentally, the first height measuring instrument 61 can be disposed on a straight line that passes through the center of the holding surface 22 of the chuck table 20 and that is parallel with the Y-axis direction. The first height measuring instrument 61 can also measure the height of the holding surface 22 along the straight line that passes through the center of the holding surface 22 and that is parallel with the Y-axis direction, by coming into contact with the holding surface 22 when the wafer 3 is not held on the holding surface 22 of the chuck table 20.

The first height measuring instrument 61 and the second height measuring instrument 62 are attached by an attaching member 63 to the holder 56 of the vertical moving mechanism 50 that holds the grinding mechanism 70. Thus, the vertical moving mechanism 50 moves the first height measuring instrument 61 and the second height measuring instrument 62 in the Z-axis direction as a direction perpendicular to the holding surface 22 together with the grinding mechanism 70.

A configuration of the first height measuring instrument 61 will be described in the following. Incidentally, the second height measuring instrument 62 has a similar configuration to that of the first height measuring instrument 61.

Figure 3:
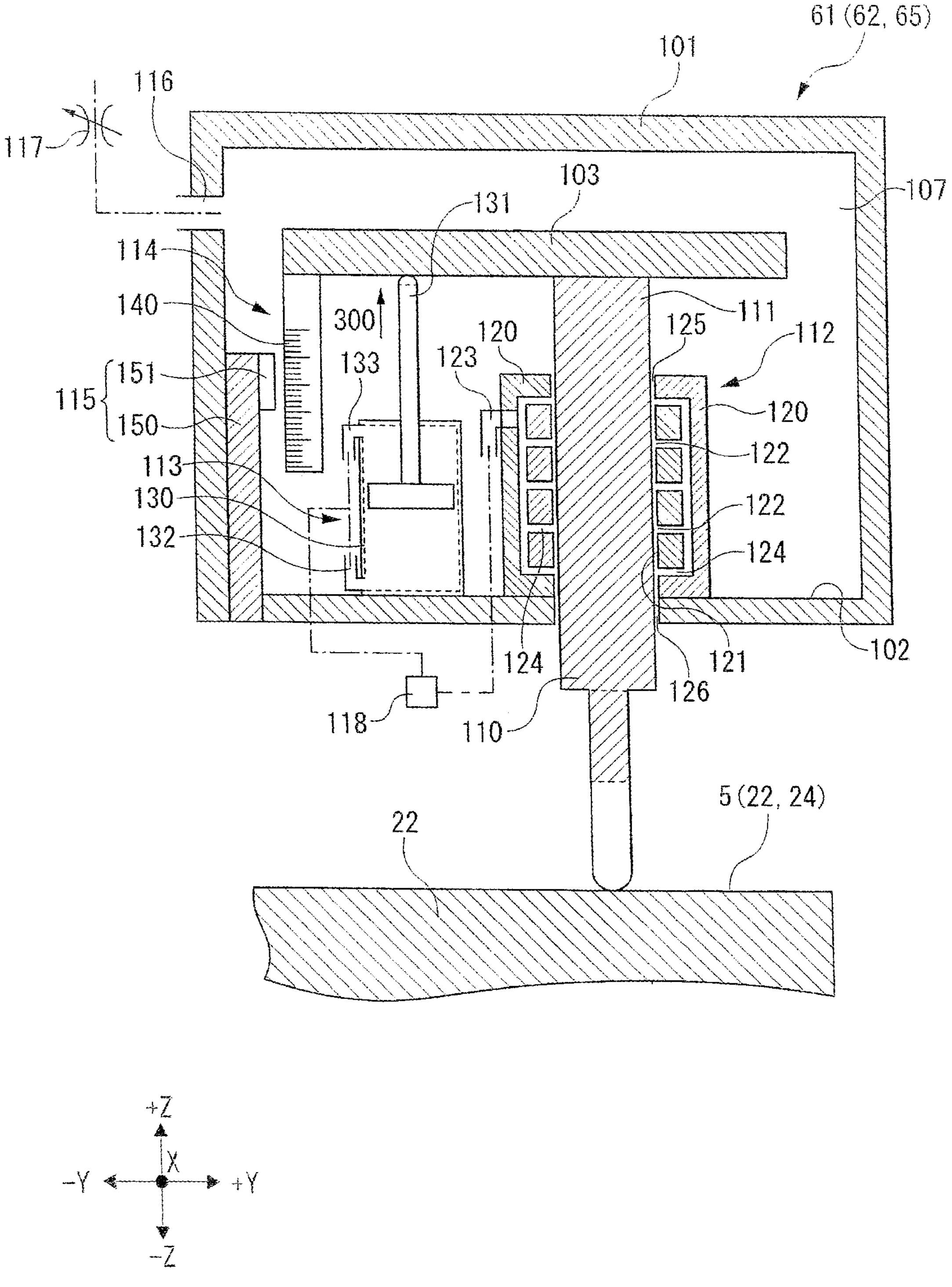
FIG. 3 is a sectional view illustrating a configuration of a first height measuring instrument.

As illustrated in FIG. 3, the first height measuring instrument 61 includes a first probe 110 that brings a distal end thereof into contact with a measurement target object, an air slider 112 as a guide portion that raisably and lowerably supports the first probe 110 such that the first probe 110 falls under own weight thereof, and a scale 114 for reading the height position of the first probe 110.

In the present embodiment, as described above, the measurement target object of the first height measuring instrument 61 is the undersurface 5 of the wafer 3 held on the chuck table 20 or the holding surface 22. In addition, the measurement target object of the second height measuring instrument 62 is the frame body surface 24 of the chuck table 20.

In the present embodiment, the first height measuring instrument 61 further includes a moving mechanism 113 that moves the first probe 110 along the Z-axis direction, a sensing mechanism 115 that reads graduations 140 of the scale 114, an exhaust port 116 and a throttle valve 117 for exhausting air, and a case 101 as a casing.

The first probe 110 extends in the Z-axis direction as a direction perpendicular to the holding surface 22. An upper end portion of the first probe 110 is coupled to a coupling member 103.

The case 101 is supported from above by the attaching member 63 illustrated in FIG. 1 and FIG. 2. As illustrated in FIG. 3, the first probe 110 is formed in a quadrangular prismatic shape, and penetrates the case 101, and a distal end part of the first probe 110 projects downward from the lower surface of the case 101.

The air slider 112 surrounds a side surface 111 of the first probe 110, and supports the first probe 110 in a noncontact manner such that the first probe 110 is movable in the Z-axis direction perpendicular to the holding surface 22.

Specifically, the air slider 112 has a cylinder 120 that houses the first probe 110. The cylinder 120 is disposed on a mounting surface 102 on the inside of the case 101. A hole for housing the first probe 110 is formed in the center of the cylinder 120. The cylinder 120 is configured to be able to support the periphery of the first probe 110 in a noncontact manner with the first probe 110 inserted through the hole.

In addition, the cylinder 120 includes an inner supporting surface 121 and a plurality of jetting ports 122 provided to the supporting surface 121. The supporting surface 121 faces the side surface 111 of the first probe 110 at a uniform interval from the side surface 111.

In addition, the cylinder 120 includes an inlet 123 connected to an air supply source 118 and a flow passage 124 that makes the inlet 123 and each of the jetting ports 122 communicate with each other.

The air slider 112 blows air supplied to the inlet 123, onto the side surface 111 of the first probe 110 via the flow passage 124 and the jetting ports 122 of the supporting surface 121 in a state in which the supporting surface 121 of the cylinder 120 is faced to the side surface 111 of the first probe 110. The air slider 112 can thereby interpose air between the side surface 111 of the first probe 110 and the supporting surface 121.

Further, the air slider 112 discharges the air that has flowed into the cylinder 120, from an upper side exhaust port 125 and a lower side exhaust port 126 of the cylinder 120. Such a structure enables the air slider 112 to support the first probe 110 in a noncontact manner to be movable in the Z-axis direction.

The exhaust port 116 is an exhaust port for exhausting, to the outside of the case 101, air exhausted into the case 101 from the air slider 112. The throttle valve 117 connected to the exhaust port 116 adjusts a pressure within the case 101 by adjusting an exhaust amount, and thereby adjusts a pressing pressure of the first probe 110 against the measurement target object.

The moving mechanism 113 is disposed on the mounting surface 102 of the case 101 and in the vicinity of the first probe 110. The moving mechanism 113 includes a cylinder 130 and a piston 131. The piston 131 moves within the cylinder 130 in the Z-axis direction parallel with an axial direction of the first probe 110.

The moving mechanism 113 also has inlets 132 and 133 for allowing air to flow into the inside of the cylinder 130, the inlets 132 and 133 being provided to the cylinder 130. The moving mechanism 113 having such a structure can move the first probe 110 in the Z-axis direction via the coupling member 103 by linearly moving the piston 131 in the Z-axis direction.

Specifically, when the first probe 110 is to be raised in a +Z direction by the moving mechanism 113, air from the air supply source 118 is supplied to the inside of the cylinder 130 via the inlet 132. Consequently, the piston 131 rises within the cylinder 130. Then, the piston 131 comes into contact with the coupling member 103 and raises the coupling member 103. The first probe 110 coupled to the coupling member 103 thereby rises.

When the first probe 110 is to be lowered by the moving mechanism 113, on the other hand, air from the air supply source 118 is supplied to the inside of the cylinder 130 via the inlet 133. Consequently, the piston 131 falls within the cylinder 130. The first probe 110 falls accordingly under the own weight of the first probe 110 and the coupling member 103 coupled to the first probe 110.

In addition, the moving mechanism 113 can adjust the falling speed of the piston 131 and thus limit the falling speed of the first probe 110 by adjusting an amount of air flowing in from the inlet 133. Then, the moving mechanism 113 can lower the first probe 110 until the distal end of the first probe 110 comes into contact with the measurement target object.

The scale 114 hangs down from an end portion of the coupling member 103, and is disposed in parallel with the Z-axis direction as the extending direction of the first probe 110. The scale 114 is coupled to the first probe 110 via the coupling member 103. The scale 114 therefore moves in the Z-axis direction together with the first probe 110.

The sensing mechanism 115 is attached to an end portion of the case 101. The sensing mechanism 115 includes a support plate 150 extending in the Z-axis direction and a sensing unit 151 disposed on a distal end of the support plate 150. The sensing unit 151 faces the graduations 140 of the scale 114, and reads the graduations 140. By thus reading the graduations 140 of the scale 114 that moves in the Z-axis direction together with the first probe 110, the sensing unit 151 can sense the height of the first probe 110 in contact with the measurement target object. Then, the height of the measurement target object can be obtained on the basis of the sensed height of the first probe 110.

In addition, as illustrated in FIG. 1, a cleaning mechanism 80 is disposed on the −Y direction side on the upper surface of the base 10. The cleaning mechanism 80 is to clean the holding surface 22 of the chuck table 20 and the wafer 3 held on the holding surface 22.

Figure 4:
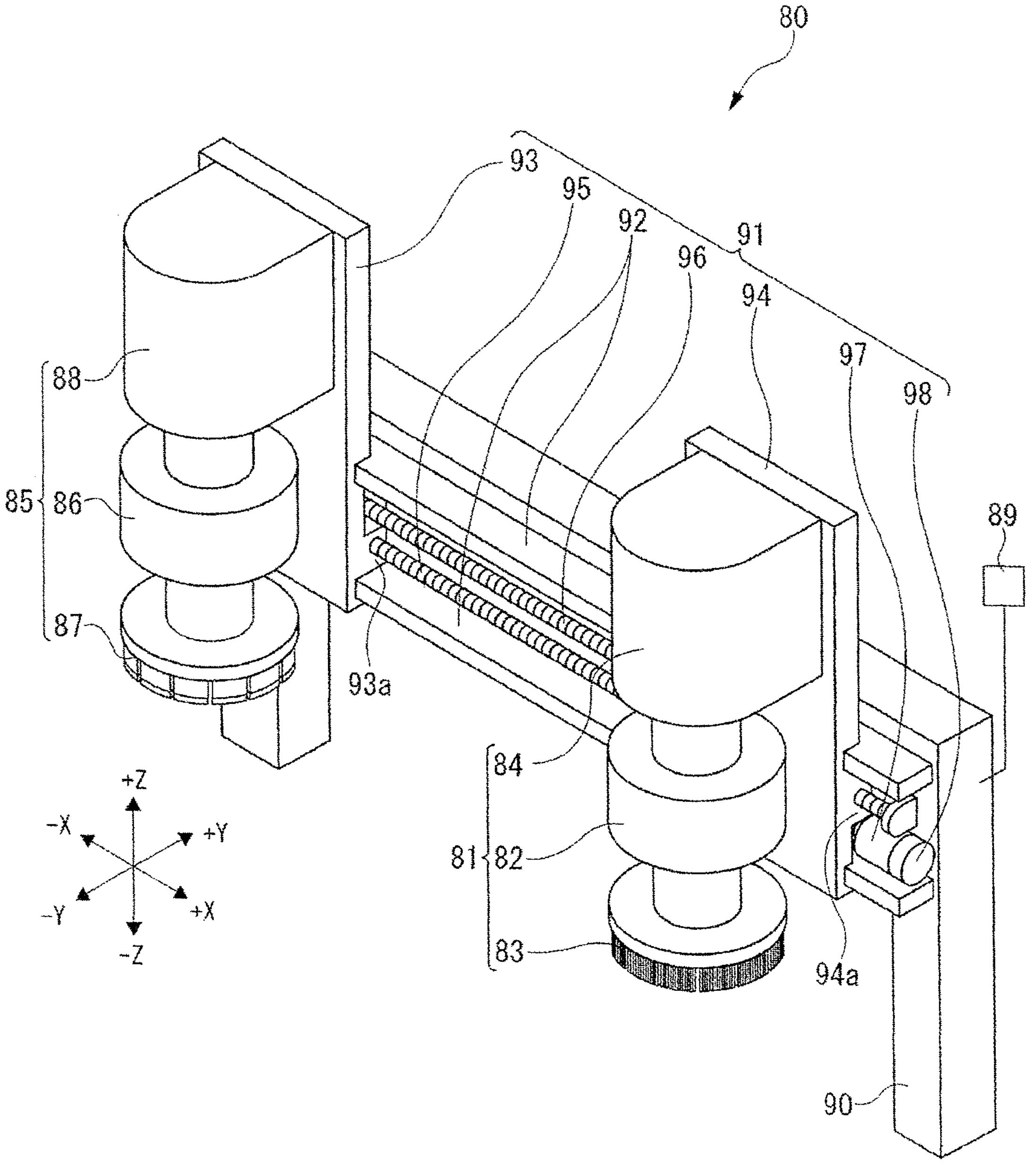
FIG. 4 is a perspective view illustrating a configuration of a cleaning mechanism.

As illustrated in FIG. 4, the cleaning mechanism 80 includes a gate-shaped column 90 erected on the base 10 in such a manner as to straddle the opening portion 13 (see FIG. 1). Further, the cleaning mechanism 80 includes, on the front surface (surface on the −Y direction side) of the gate-shaped column 90, a wafer cleaning mechanism 81, a holding surface cleaning mechanism 85, and a cleaning moving mechanism 91 that moves these cleaning mechanisms along an X-axis direction.

The cleaning moving mechanism 91 includes a pair of guide rails 92 extending in the X-axis direction, a first table 93 and a second table 94 attached to the guide rails 92, a first ball screw 95 and a second ball screw 96 extending in parallel with the guide rails 92, a first motor 97 that rotates the first ball screw 95, a first encoder 98 for sensing an amount of rotation of the first ball screw 95, a second motor (not illustrated) that rotates the second ball screw 96, and a second encoder (not illustrated) for sensing an amount of rotation of the second ball screw 96.

The pair of guide rails 92 is disposed on the front surface of the gate-shaped column 90 in such a manner as to be parallel with the X-axis direction. The first table 93 and the second table 94 are installed on the pair of guide rails 92 in such a manner as to be slidable along the guide rails 92. The holding surface cleaning mechanism 85 is attached onto the first table 93. The wafer cleaning mechanism 81 is attached onto the second table 94.

The first ball screw 95 is screwed into a nut portion 93*a* provided to the first table 93. The first motor 97 is coupled to an end portion on a +X direction side of the first ball screw 95. The first motor 97 rotationally drives the first ball screw 95. When the first ball screw 95 is rotationally driven, the first table 93 and the holding surface cleaning mechanism 85 move in the X-axis direction along the guide rails 92. At this time, the first encoder 98 is rotated when the first motor 97 rotates the first ball screw 95. The first encoder 98 recognizes the amount of rotation (the number of times of rotation and a rotational angle) of the first ball screw 95. Then, the controller 7 (see FIG. 1) can sense the position in the X-axis direction of the holding surface cleaning mechanism 85 on the basis of a result of the recognition.

Similarly, the second ball screw 96 is screwed into a nut portion 94*a* of the second table 94, and is rotationally driven by the second motor coupled to an end portion on a −X direction side of the second ball screw 96. The second table 94 and the wafer cleaning mechanism 81 thereby move in the X-axis direction along the guide rails 92. At this time, the second encoder recognizes the amount of rotation of the second ball screw 96. Then, the controller 7 can sense the position in the X-axis direction of the wafer cleaning mechanism 81 on the basis of a result of the recognition.

The wafer cleaning mechanism 81 is to clean the wafer 3 that has undergone grinding processing or has not yet undergone the grinding processing and that is held on the chuck table 20 positioned at the holding position 301 (see FIG. 1) on the −Y direction side. The wafer cleaning mechanism 81 includes a cleaning brush 83 that is rotationally driven by a brush motor 82 and a brush raising and lowering mechanism 84 that raises and lowers the brush motor 82 and the cleaning brush 83 in the Z-axis direction.

The holding surface cleaning mechanism 85 is to clean the holding surface 22 of the chuck table 20 positioned at the holding position 301, after the wafer 3 resulting from the grinding processing is removed. The holding surface cleaning mechanism 85 includes cleaning grindstones 87 that are rotationally driven by a grindstone motor 86 and a grindstone raising and lowering mechanism 88 that raises and lowers the grindstone motor 86 and the cleaning grindstones 87 in the Z-axis direction. Incidentally, the cleaning mechanism 80 further includes a cleaning water supply mechanism 89 that supplies cleaning water to the cleaning brush 83 and the cleaning grindstones 87.

The controller 7 illustrated in FIG. 1 includes a central processing unit (CPU) that performs arithmetic processing according to a control program, a storage unit 7*a* constituted by a storage medium such as a memory, and the like. For example, the controller 7 performs the grinding processing of the wafer 3 by controlling the above-described various members of the grinding apparatus 1. In the following, description will be made of operation of the grinding processing of the wafer 3.

[Holding Step]

In the grinding processing of the wafer 3, first, the controller 7 controls the Y-axis direction moving mechanism 40 to dispose the wafer holding mechanism 30 including the chuck table 20 at the holding position 301 on the −Y direction side for holding the wafer 3 by the holding surface 22. Next, a worker mounts the wafer 3 on the holding surface 22 of the chuck table 20 such that the undersurface 5 is oriented upward. Thereafter, the controller 7 makes the holding surface 22 communicate with the suction source. The wafer 3 is thereby held under suction by the holding surface 22.

[Wafer Cleaning Step]

After the holding step, the controller 7 controls the cleaning moving mechanism 91 of the cleaning mechanism 80 illustrated in FIG. 4 to dispose the wafer cleaning mechanism 81 above the wafer 3 held by the holding surface 22. Further, the controller 7 rotates the cleaning brush 83 by the brush motor 82, and rotates the chuck table 20 by the rotating mechanism 26. Then, while the controller 7 supplies the cleaning water from the cleaning water supply mechanism 89 to the cleaning brush 83, the controller 7 lowers the cleaning brush 83 by the brush raising and lowering mechanism 84, and brings the cleaning brush 83 into contact with the undersurface 5. The controller 7 thereby cleans the undersurface 5 of the wafer 3. Incidentally, this wafer cleaning step may be omitted.

[Grinding Step]

Thereafter, the controller 7 disposes the wafer holding mechanism 30 including the chuck table 20 holding the wafer 3 under suction, at the processing position 302 by the Y-axis direction moving mechanism 40 illustrated in FIG. 1. Then, while the controller 7 rotates the grinding stones 77 of the grinding mechanism 70 and the chuck table 20, the controller 7 lowers the grinding mechanism 70 by the vertical moving mechanism 50, and grinds, by the grinding stones 77, the undersurface 5 of the wafer 3 held by the holding surface 22 of the chuck table 20. At this time, the controller 7 measures the thickness of the wafer 3 being ground, by using the first thickness measuring instrument 60, and performs the grinding until the thickness of the wafer 3 becomes a predetermined thickness.

[Wafer Separating Step]

After the grinding step, the controller 7 disposes the wafer holding mechanism 30 including the chuck table 20 holding the wafer 3 under suction, at the holding position 301 by the Y-axis direction moving mechanism 40, and terminates the communication between the holding surface 22 and the suction source. Further, the controller 7 makes the holding surface 22 communicate with an unillustrated fluid supply source, and jets fluid (air and/or water) from the holding surface 22. The wafer 3 is thereby separated from the holding surface 22, and is collected by the worker. Incidentally, before terminating the communication between the holding surface 22 and the suction source, the controller 7 may clean the undersurface 5 of the wafer 3 by performing the wafer cleaning step described above.

[Holding Surface Cleaning Step]

Next, the controller 7 cleans the holding surface 22 from which the wafer 3 is separated. Specifically, the controller 7 controls the cleaning moving mechanism 91 illustrated in FIG. 4 to dispose the holding surface cleaning mechanism 85 above the holding surface 22. Further, the controller 7 rotates the cleaning grindstones 87 by the grindstone motor 86, and rotates the chuck table 20 by the rotating mechanism 26. Then, while the controller 7 supplies the cleaning water from the cleaning water supply mechanism 89 to the cleaning grindstones 87, the controller 7 lowers the cleaning grindstones 87 by the grindstone raising and lowering mechanism 88, and brings the cleaning grindstones 87 into contact with the holding surface 22. The controller 7 thereby cleans the holding surface 22. Consequently, grinding swarf adhering to the holding surface 22, for example, is removed.

In the present embodiment, in addition to such grinding processing, the controller 7 also performs a holding surface maintaining method for maintaining the holding surface 22 of the chuck table 20 in a normal state. In the following, the holding surface maintaining method according to the present embodiment will be described.

[Holding Surface Grinding Step]

In the holding surface maintaining method, first, the worker attaches the holding surface grinding wheel 175 including the holding surface grinding stones 177 to the wheel mount 74 in place of the grinding wheel 75 illustrated in FIG. 1. Then, the controller 7 grinds the holding surface 22 of the chuck table 20 by the holding surface grinding stones 177. Incidentally, in this grinding, the Y-axis direction moving mechanism 40 moves the chuck table 20 to a position where the holding surface grinding stones 177 pass the center of the holding surface 22. Then, the holding surface grinding stones 177 come into contact with a radius part of the holding surface 22, and grind the holding surface 22.

Specifically, the controller 7 disposes the wafer holding mechanism 30 including the chuck table 20 at the processing position 302 by the Y-axis direction moving mechanism 40. At the processing position 302, the holding surface grinding stones 177 pass the center of the holding surface 22. Then, while the controller 7 rotates the holding surface grinding stones 177 of the grinding mechanism 70 and the chuck table 20, the controller 7 lowers the grinding mechanism 70 by the vertical moving mechanism 50, and brings the holding surface grinding stones 177 into contact with the radius part of the holding surface 22 of the chuck table 20. The controller 7 thereby grinds the holding surface 22 by the holding surface grinding stones 177. This grinding is performed such that the holding surface 22 forms the shape of a circular conical surface having the center of the holding surface 22 as a vertex thereof and such that the holding surface 22 and the frame body surface 24 are flush with each other.

Consequently, the radius part of the holding surface 22 becomes parallel with the lower surface of the holding surface grinding stones 177, that is, the lower surface of the grinding stones 77 having the same shape as that of the holding surface grinding stones 177. The holding surface 22 is thus set in a normal state. By holding the wafer 3 by such a holding surface 22 and performing the grinding step, it is possible to excellently suppress the occurrence of a thickness defect (nonuniform thickness) in the wafer 3 that has undergone the grinding.

[Initial Holding Surface Height Measuring Step]

Next, the controller 7 performs an initial holding surface height measuring step of measuring the height of the holding surface 22 ground in the holding surface grinding step, at a plurality of measurement points having different distances from the center of the holding surface 22.

Specifically, the controller 7 controls the vertical moving mechanism 50 to lower the first thickness measuring instrument 60 in such a manner as to be able to measure the height of the holding surface 22 by the first height measuring instrument 61 of the first thickness measuring instrument 60 attached to the holder 56.

Further, the controller 7 moves the wafer holding mechanism 30 including the chuck table 20 in the Y-axis direction by the Y-axis direction moving mechanism 40. At this time, the controller 7 senses the position in the Y-axis direction of the chuck table 20 moved in the Y-axis direction, by using the Y-axis encoder 46 of the Y-axis direction moving mechanism 40.

Then, when one of the plurality of measurement points set in advance on the holding surface 22 of the chuck table 20 is positioned below the first probe 110 (see FIG. 3) of the first height measuring instrument 61, the controller 7 brings the first probe 110 into contact with the measurement point by lowering the first probe 110, and measures the height of the holding surface 22 at the measurement point. Thus, the controller 7 can measure the height of the holding surface 22 by the first height measuring instrument 61 at the plurality of measurement points in the radial direction of the holding surface 22, that is, at the plurality of measurement points having distances different from each other from the center of the holding surface 22.

Figure 5:
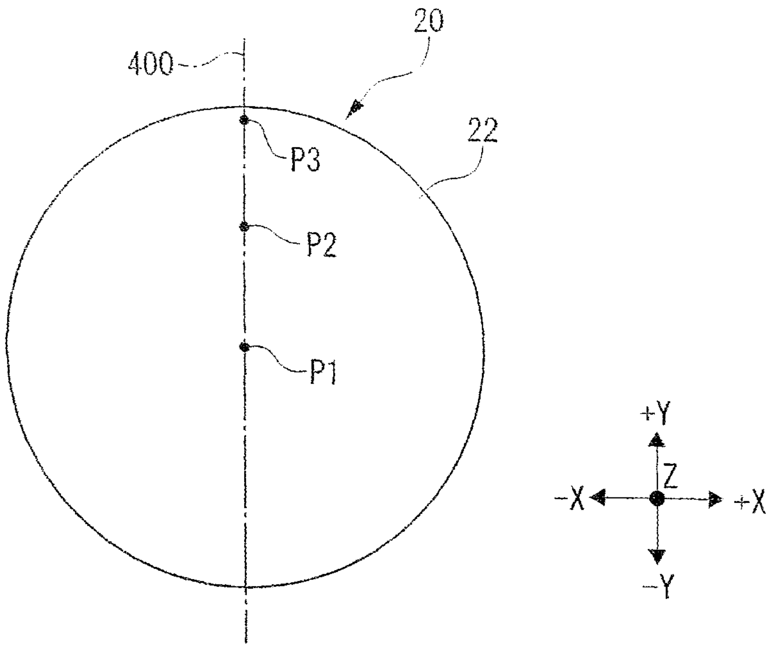
FIG. 5 is a plan view illustrating a linear measurement trajectory.

In the present example, as illustrated in FIG. 5, the plurality of measurement points having different distances from the center are arranged on a linear measurement trajectory 400 along the diameter of the holding surface 22. The measurement trajectory 400 is a straight line passing through the center of the holding surface 22 and parallel with the Y-axis direction.

Incidentally, the number of the plurality of measurement points can be set to be any number desired by the worker. FIG. 5 illustrates three measurement points P1, P2, and P3 included in the plurality of measurement points having different distances from the center of the holding surface 22. The measurement point P1 is a part in the vicinity of the center of the holding surface 22. The measurement point P2 is a part between the outer circumferential edge and the center of the holding surface 22. The measurement point P3 is a part in the vicinity of the outer circumferential edge of the holding surface 22.

[Storage Step]

Next, the controller 7 stores, in the storage unit 7*a*, initial holding surface height data as data on the height of the holding surface 22 which height is measured in the initial holding surface height measuring step. As described above, the initial holding surface height data is data on the height of the holding surface 22 at the plurality of measurement points set in advance.

After this storage step, the holding surface maintaining method is suspended temporarily, and the operation of grinding the wafer 3 described above is performed. Specifically, the worker attaches the grinding wheel 75 to the wheel mount 74 in place of the holding surface grinding wheel 175. Then, the operation of the grinding processing of the wafer 3, including the holding step, the wafer cleaning step, the grinding step, the wafer separating step, and the holding surface cleaning step described above, is performed.

Then, after the operation of the grinding processing of the wafer 3 progresses and the grinding step (grinding of the wafer 3 held on the holding surface 22) and the holding surface cleaning step (cleaning of the holding surface 22 from which the wafer 3 is separated) are performed a plurality of times (for example, a predetermined number of times), the controller 7 resumes the holding surface maintaining method, and performs an interim holding surface height measuring step in the following.

[Interim Holding Surface Height Measuring Step]

In this step, the controller 7 measures the height of the holding surface 22 at the same measurement points as in the initial holding surface height measuring step. Specifically, the controller 7 controls the vertical moving mechanism 50 to lower the first thickness measuring instrument 60 in such a manner as to be able to measure the height of the holding surface 22 by the first height measuring instrument 61 of the first thickness measuring instrument 60 attached to the holder 56.

Further, the controller 7 moves the wafer holding mechanism 30 including the chuck table 20 in the Y-axis direction by the Y-axis direction moving mechanism 40. At this time, the controller 7 senses the position in the Y-axis direction of the chuck table 20 moved in the Y-axis direction by using the Y-axis encoder 46 of the Y-axis direction moving mechanism 40.

Then, when one of the plurality of measurement points described above on the holding surface 22 of the chuck table 20 is positioned below the first probe 110 (see FIG. 3) of the first height measuring instrument 61, the controller 7 brings the first probe 110 into contact with the measurement point by lowering the first probe 110, and measures the height of the holding surface 22 at the measurement point. Thus, the controller 7 can measure the height of the holding surface 22 at the same plurality of measurement points as in the initial holding surface height measuring step by the first height measuring instrument 61. Incidentally, the controller 7 may store, in the storage unit 7*a*, for example, interim holding surface height data as data on the height of the holding surface 22 which height is measured in the interim holding surface height measuring step.

[Determining Step]

Next, the controller 7 obtains, at each measurement point, a difference between the initial holding surface height data stored in the storage step and the interim holding surface height data measured in the interim holding surface height measuring step. Then, when the obtained difference is equal to or less than an allowable value set in advance, the controller 7 determines that the holding surface 22 is normal. On the other hand, when this difference exceeds the allowable value, the controller 7 determines that the holding surface 22 is abnormal.

Figure 6:
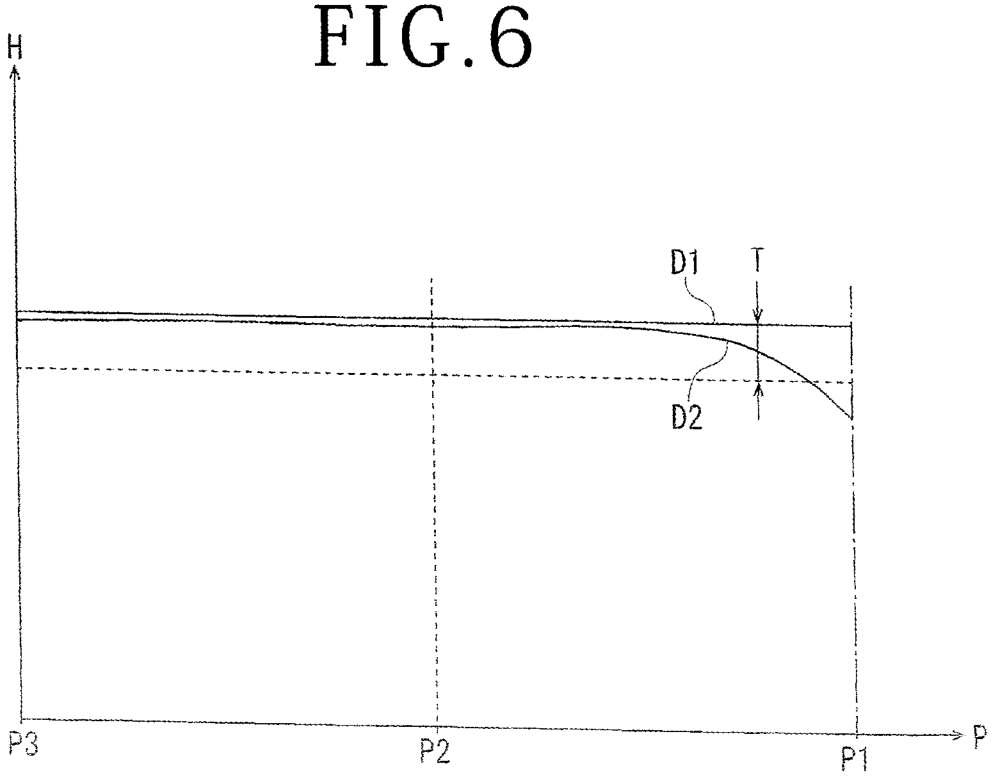
FIG. 6 is a graph illustrating relation between a position on a holding surface and the height of the holding surface in initial holding surface height data and interim holding surface height data.

FIG. 6 is a graph illustrating relation between a position P in the radial direction on the holding surface 22 and the height H of the holding surface 22 in the initial holding surface height data D1 and the interim holding surface height data D2. This figure illustrates positions corresponding to the above-described three measurement points P1, P2, and P3 illustrated in FIG. 5, the three measurement points P1, P2, and P3 being included in the plurality of measurement points having different distances from the center of the holding surface 22. That is, with regard to the position P in this graph, a left end corresponds to the outer circumferential edge of the holding surface 22, while a right end corresponds to the center of the holding surface 22.

In an example illustrated in this figure, the center of the holding surface 22 is lowered as compared with the outer circumferential edge thereof after undergoing the grinding step and the holding surface cleaning step a plurality of times. Hence, the difference between the initial holding surface height data D1 and the interim holding surface height data D2 is a value equal to or less than an allowable value T at the measurement point P3 as a part in the vicinity of the outer circumferential edge of the holding surface 22 and at the measurement point P2 as a part between the outer circumferential edge and the center of the holding surface 22. On the other hand, the above-described difference exceeds the allowable value T at the measurement point P1 as a part in the vicinity of the center of the holding surface 22. Hence, in the present example, the controller 7 determines in the determining step that there is an abnormality in the holding surface 22. Incidentally, the allowable value may be one value common to all of the measurement points as described above, or may be set differently for each measurement point.

Then, in the present embodiment, when the controller 7 determines in the determining step that there is an abnormality in the holding surface 22, a holding surface restoring step in the following is performed.

[Holding Surface Restoring Step]

In this step, the holding surface 22 is ground by the holding surface grinding stones 177 when it is determined that there is an abnormality in the holding surface 22.

Specifically, the controller 7 notifies the worker to the effect that there is an abnormality in the holding surface 22, by using the touch panel 9 illustrated in FIG. 1. In response to this, the worker attaches the holding surface grinding wheel 175 including the holding surface grinding stones 177 to the wheel mount 74 in place of the grinding wheel 75 illustrated in FIG. 1. Then, as in the holding surface grinding step described above, the controller 7 grinds the holding surface 22 of the chuck table 20 by the holding surface grinding stones 177. Consequently, the radius part of the holding surface 22 becomes parallel with the lower surface of the holding surface grinding stones 177, that is, the lower surface of the grinding stones 77 having the same shape as that of the holding surface grinding stones 177, so that the holding surface 22 is set in a normal state. In the present embodiment, the holding surface 22 is thus maintained in a normal state.

As described above, in the present embodiment, whether or not there is an abnormality in the holding surface 22 is determined on the basis of the difference between the initial holding surface height data as the height of the holding surface 22 immediately after the holding surface grinding step (self-grinding) and the interim holding surface height data as the height of the holding surface 22 after the grinding step and the holding surface cleaning step are performed a plurality of times. Then, when it is determined that there is an abnormality, the holding surface restoring step is performed to restore the holding surface 22 to a normal state. Hence, the holding surface 22 can be maintained in a normal state. It is therefore possible to excellently suppress the occurrence of a thickness defect in the wafer 3 after grinding.

In addition, in the present embodiment, the wafer 3 does not need to be ground in order to determine whether or not there is an abnormality in the holding surface 22. It is therefore possible to suppress an amount of consumption of wafers 3.

Incidentally, in the determining step in the holding surface maintaining method described above, the controller 7 may determine that there is an abnormality in the holding surface 22, when the difference between the initial holding surface height data and the interim holding surface height data exceeds the allowable value at one measurement point, as described above. Alternatively, the controller 7 may determine that there is an abnormality in the holding surface 22, when the difference between the initial holding surface height data and the interim holding surface height data exceeds the allowable value at a plurality of measurement points (for example, a predetermined number of measurement points or more).

In addition, the interim holding surface height measuring step, the determining step, and the holding surface restoring step may be performed at any timing of the worker after the storage step. For example, immediately before the worker starts the grinding processing of the wafer 3, the worker may determine the quality of the holding surface 22 by the interim holding surface height measuring step and the determining step, and perform the holding surface restoring step (self-grinding) as required. It is thereby possible to excellently suppress the occurrence of a thickness defect in the wafer 3 after grinding.

In addition, in the above-described example, the plurality of measurement points having different distances from the center of the holding surface 22 as measurement points in the initial holding surface height measuring step and the interim holding surface height measuring step are arranged on a line 400 along the diameter of the holding surface 22, as illustrated in FIG. 5. In regard to this, the plurality of measurement points having different distances from the center of the holding surface 22 may be arranged spirally.

In this case, in the initial holding surface height measuring step and the interim holding surface height measuring step, the controller 7 controls the Y-axis direction moving mechanism 40 to position the first height measuring instrument 61 of the first thickness measuring instrument 60 above the center of the holding surface 22 of the chuck table 20. Further, the controller 7 controls the vertical moving mechanism 50 to lower the first thickness measuring instrument 60 in such a manner as to be able to measure the height of the holding surface 22 by the first height measuring instrument 61.

Next, the controller 7 horizontally moves the chuck table 20 along the Y-axis direction by using the Y-axis direction moving mechanism 40. At this time, the controller 7 senses the position in the Y-axis direction of the chuck table 20 moved in the Y-axis direction, by using the Y-axis encoder 46 of the Y-axis direction moving mechanism 40.

Further, the controller 7 rotates the chuck table 20 by using the rotating mechanism 26 illustrated in FIG. 1, and thereby rotates the holding surface 22. Consequently, the first height measuring instrument 61 spirally (helically) moves relative to the holding surface 22 of the chuck table 20 as in a measurement trajectory 401 illustrated in FIG. 7, for example.

Then, when one of the plurality of measurement points set in advance on the holding surface 22 of the chuck table 20 is positioned below the first probe 110 (see FIG. 3) of the first height measuring instrument 61, the controller 7 brings the first probe 110 into contact with the measurement point by lowering the first probe 110, and measures the height of the holding surface 22 at the measurement point. Thus, the controller 7 can measure the height of the holding surface 22 by the first height measuring instrument 61 at the plurality of measurement points having different distances from the center of the holding surface 22.

Figure 7:
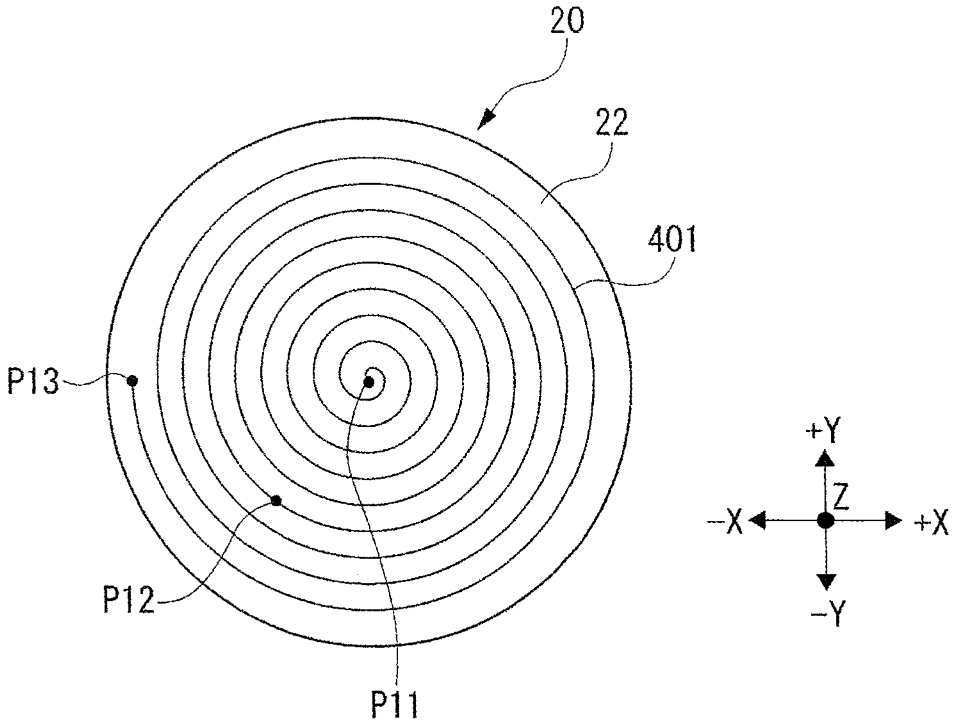
FIG. 7 is a plan view illustrating a spiral measurement trajectory.

In the present example, the plurality of measurement points having different distances from the center are arranged along the measurement trajectory 401 in a spiral shape (helical shape), as illustrated in FIG. 7. Incidentally, FIG. 7 illustrates three measurement points P11, P12, and P13 included in the plurality of measurement points having different distances from the center of the holding surface 22.

Thus, in the initial holding surface height measuring step and the interim holding surface height measuring step, the controller 7 may measure the height of the holding surface 22 spirally while rotating the chuck table 20.

Figure 8:
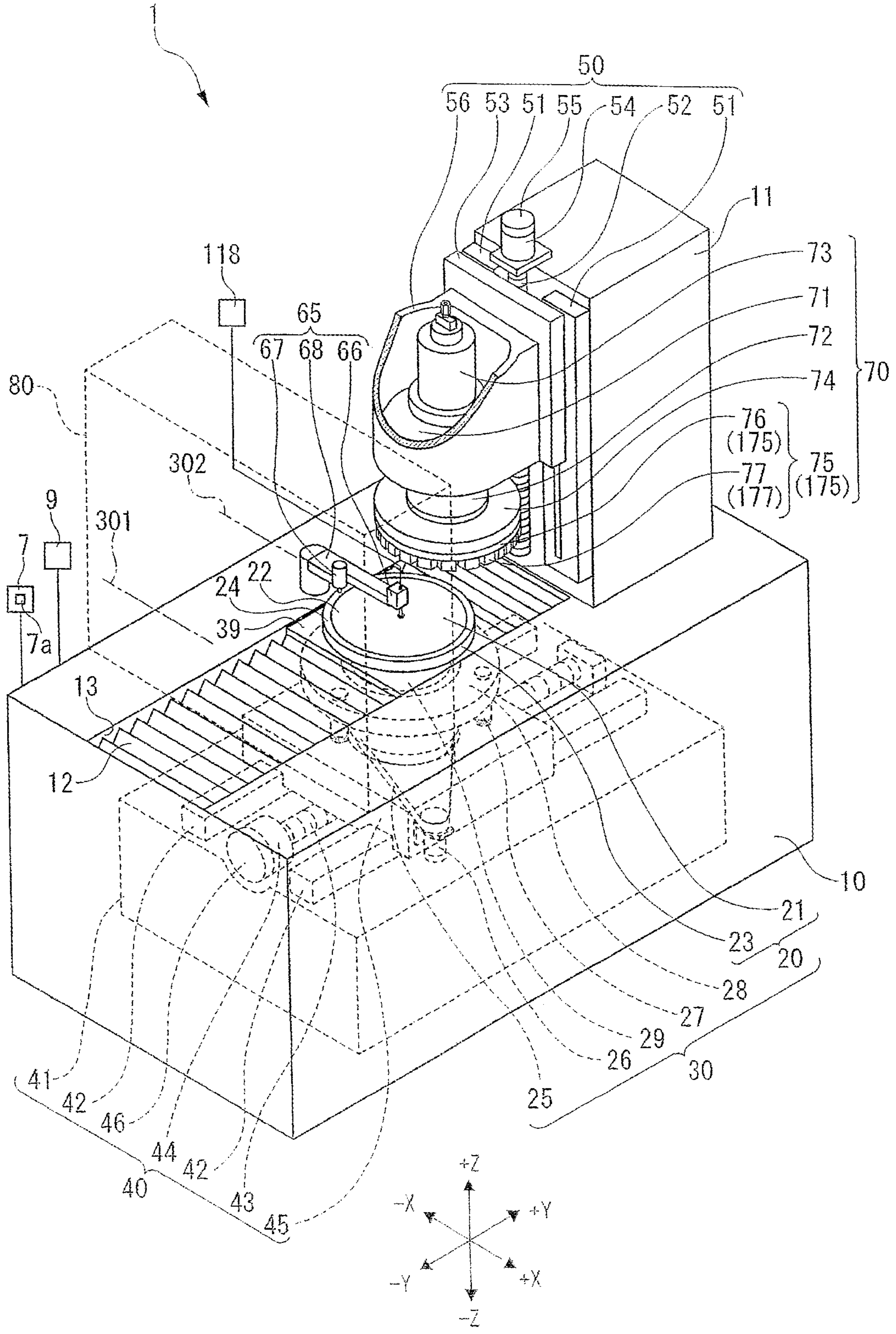
FIG. 8 is a perspective view illustrating another configuration of the grinding apparatus.

Incidentally, in the grinding apparatus 1, a thickness measuring instrument for measuring the thickness of the wafer 3 may be provided on the base 10. In this case, as illustrated in FIG. 8, for example, a second thickness measuring instrument 65 is disposed on the base 10 and on a side of the opening portion 13 in place of the first thickness measuring instrument 60.

The second thickness measuring instrument 65 includes a third height measuring instrument 66 for measuring the height of the wafer 3 held on the holding surface 22. The third height measuring instrument 66 has a configuration similar to that of the first height measuring instrument 61 illustrated in FIG. 3. In addition, the second thickness measuring instrument 65 includes an arm 68 that supports the third height measuring instrument 66. The third height measuring instrument 66 can therefore be disposed above the center of the holding surface 22 of the chuck table 20.

In addition, by swinging in a horizontal direction in a state of supporting the third height measuring instrument 66 by the arm 68, the second thickness measuring instrument 65 can adjust the position in the horizontal direction of the third height measuring instrument 66 on a swing trajectory passing through the center of the holding surface 22.

In addition, the second thickness measuring instrument 65 includes a holding surface height measuring instrument 67 of a contact type or a noncontact type for measuring the height of the frame body surface 24 of the chuck table 20 (that is, the height of the holding surface 22), the holding surface height measuring instrument 67 being provided to the arm 68. The holding surface height measuring instrument 67 may have a configuration similar to that of the third height measuring instrument 66.

Then, as with the first thickness measuring instrument 60, the second thickness measuring instrument 65 can calculate the thickness of the wafer 3 on the basis of the difference between the measured height of the wafer 3 and the measured height of the holding surface 22.

In addition, the holding surface maintaining method according to the present embodiment described above can be performed also by using the third height measuring instrument 66 of such a second thickness measuring instrument 65. Specifically, in this case, in the initial holding surface height measuring step and the interim holding surface height measuring step, the controller 7 disposes the third height measuring instrument 66 above the center of the holding surface 22 of the chuck table 20 located at the processing position 302.

Further, the controller 7 moves the wafer holding mechanism 30 including the chuck table 20 in the Y-axis direction by the Y-axis direction moving mechanism 40. When one of the plurality of measurement points described above on the holding surface 22 of the chuck table 20 is positioned below the first probe 110 (see FIG. 3) of the third height measuring instrument 66, the controller 7 brings the first probe 110 into contact with the measurement point by lowering the first probe 110, and measures the height of the holding surface 22 at the measurement point. Thus, the controller 7 can measure the height of the holding surface 22 by the third height measuring instrument 66 at the plurality of measurement points arranged on the straight line 400 along the diameter of the holding surface 22 as illustrated in FIG. 5.

In addition, with this configuration, it is possible to move the third height measuring instrument 66 spirally as in the measurement trajectory 401 illustrated in FIG. 7 relative to the holding surface 22 of the chuck table 20 by swinging the third height measuring instrument 66 from the center to the outside of the holding surface 22 by using the arm 68 or moving the chuck table 20 in the Y-axis direction from a state in which the third height measuring instrument 66 is disposed at the center of the holding surface 22 in addition to rotating the holding surface 22 of the chuck table 20 by using the rotating mechanism 26 illustrated in FIG. 1. Hence, this configuration also enables the measurement of the height of the holding surface 22 at the plurality of measurement points arranged spirally.

Figure 9:
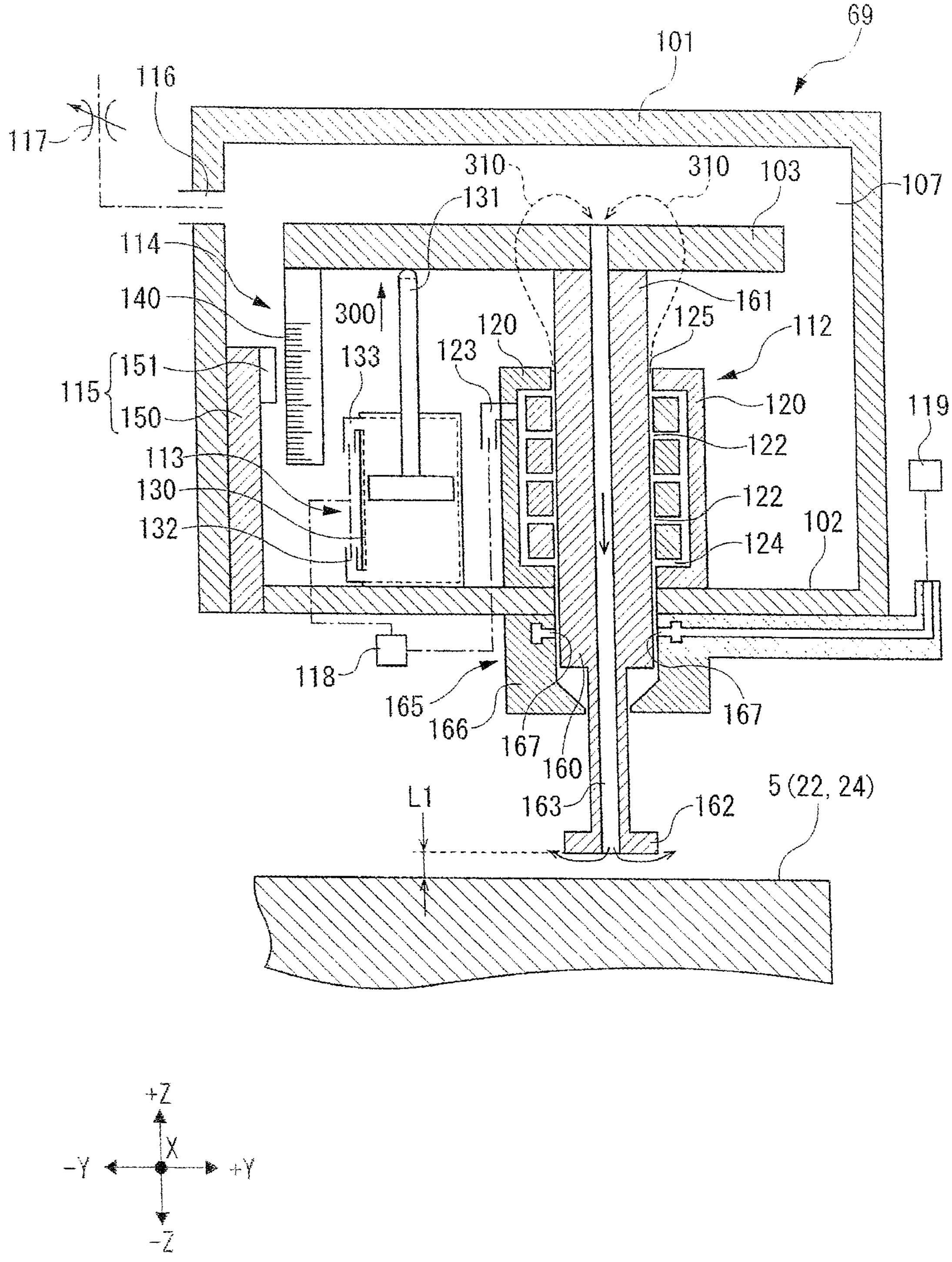
FIG. 9 is a sectional view illustrating another configuration of the first height measuring instrument.

In addition, the first thickness measuring instrument 60 illustrated in FIG. 1 may include a fourth height measuring instrument 69 of a noncontact type as illustrated in FIG. 9 in place of the first height measuring instrument 61 and the second height measuring instrument 62 as a contact type height measuring instrument illustrated in FIG. 3. In addition, the second thickness measuring instrument 65 illustrated in FIG. 8 may also include the fourth height measuring instrument 69 in place of the third height measuring instrument 66.

The fourth height measuring instrument 69 is configured to have a second probe 160 in place of the first probe 110 in the configuration of the first height measuring instrument 61 illustrated in FIG. 3.

The second probe 160 has a lower end portion 162 increased in diameter into a flange shape at a distal end thereof and includes a communication passage 163 passing through an inner part from an upper end of the second probe 160 to the lower end portion 162 in the configuration of the first probe 110. An upper end of the communication passage 163 penetrates the coupling member 103, and is opened to the inside of the case 101. On the other hand, a lower end side of the communication passage 163 is opened to the lower surface of the lower end portion 162.

A sealing mechanism 165 that covers the second probe 160 is disposed on the lower surface of the case 101. The sealing mechanism 165 includes a tubular member 166 attached to the lower surface of the case 101. The tubular member 166 surrounds the second probe 160 such that a gap is provided between the tubular member 166 and a side surface 161 of the second probe 160. In addition, the tubular member 166 has a water jetting port 167 in an inner surface thereof. This water jetting port 167 is configured to communicate with a water supply source 119, and thereby jet water to the gap between the side surface 161 of the second probe 160 and the inner surface of the tubular member 166.

Thus, the sealing mechanism 165 prevents air from leaking out of the case 101, by filling water into the gap between the side surface 161 of the second probe 160 and the inner surface of the tubular member 166.

In the fourth height measuring instrument 69 having such a configuration, at a time of a height measurement, air is supplied from the air supply source 118 to the inlet 123 of the air slider 112, and the air is jetted from the jetting ports 122 to the side surface 161 of the second probe 160. The air slider 112 thereby supports the second probe 160 in a noncontact manner. In addition, when the piston 131 of the moving mechanism 113 is lowered, the second probe 160 is lowered under own weight thereof toward the measurement target object (the undersurface 5 of the wafer 3, the frame body surface 24, or the holding surface 22).

At this time, the air supplied to the air slider 112 is exhausted from the upper side exhaust port 125 of the cylinder 120 of the air slider 112 to the inside of the case 101, and fills the inside of the case 101. Further, as indicated by an arrow 310, this air flows from the upper end of the communication passage 163 in the second probe 160 into the communication passage 163. Then, the air is discharged from an opening portion of the lower end portion 162 in the second probe 160 which opening portion faces the measurement target object, and the air flows radially to the outside in the radial direction of the lower end portion 162. Consequently, the whole of the second probe 160 including the lower end portion 162 floats over the workpiece with a predetermined width L1 in μm units, for example, therebetween.

Then, the fourth height measuring instrument 69 can sense the height of the second probe 160 facing the measurement target object, by reading the graduations 140 of the scale 114 at this time. Then, the height of the workpiece can be obtained on the basis of the sensed height of the second probe 160 and the predetermined width L1 described above.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A holding surface maintaining method for maintaining, in a normal state, a holding surface of a chuck table of a grinding apparatus, where the grinding apparatus is configured to grind, by grinding stones, a wafer held on the holding surface of the chuck table, the holding surface maintaining method comprising:

a holding surface grinding step of grinding the holding surface by holding surface grinding stones;

an initial holding surface height measuring step of measuring a height of the holding surface ground in the holding surface grinding step, at a plurality of measurement points having different distances from a center of the holding surface;

a storage step of storing initial holding surface height data as data on the height of the holding surface, the height being measured in the initial holding surface height measuring step;

an interim holding surface height measuring step of measuring the height of the holding surface at the same measurement points as in the initial holding surface height measuring step after performing, a plurality of times after the storage step, the grinding of the wafer held on the holding surface and cleaning of the holding surface from which the wafer is separated;

a determining step of obtaining, at each of the measurement points, a difference between the initial holding surface height data stored in the storage step and interim holding surface height data as data on the height of the holding surface, the height being measured in the interim holding surface height measuring step, and determining, when the difference is equal to or less than an allowable value set in advance, that the holding surface is normal or determining, when the difference exceeds the allowable value, that the holding surface is abnormal; and a holding surface restoring step of grinding the holding surface by the holding surface grinding stones when it is determined in the determining step that the holding surface is abnormal.

2. The holding surface maintaining method according to claim 1, wherein:

the grinding apparatus includes a rotating mechanism that rotates the chuck table about the center of the holding surface, and, in the initial holding surface height measuring step and the interim holding surface height measuring step, the chuck table is rotated, and the height of the holding surface is measured spirally.

* * * * *